United States Patent [19]
Koerber

[11] 3,872,041
[45] Mar. 18, 1975

[54] THERMOPLASTIC FILM
[75] Inventor: Marvin A. Koerber, Abbeville, S.C.
[73] Assignee: Automation Industries, Inc., Century City, Los Angeles County, Calif.
[22] Filed: May 31, 1973
[21] Appl. No.: 365,566

[52] U.S. Cl. ... 260/23 XA, 260/23 H, 260/45.75 R, 260/45.85 E
[51] Int. Cl. .......................................... C08f 19/14
[58] Field of Search ...... 260/23 XA, 23 H, 45.75 R, 260/45.85 E

[56] References Cited
UNITED STATES PATENTS

| | | | |
|---|---|---|---|
| 2,307,092 | 1/1943 | Yngve | 260/23 XA |
| 3,338,852 | 8/1967 | Reventas | 260/23 XA |
| 3,356,634 | 12/1967 | McGinley | 260/23 XA |
| 3,468,828 | 9/1969 | Perrins | 260/23.7 |
| 3,539,636 | 11/1970 | Dorfelt | 260/23 XA |
| 3,591,551 | 6/1971 | Seki | 260/23 XA |
| 3,720,643 | 3/1973 | Abu-Isa | 260/41 A |
| 3,772,409 | 11/1973 | Scarso et al | 260/23 XA |

*Primary Examiner*—Melvyn I. Marquis
*Assistant Examiner*—William E. Parker
*Attorney, Agent, or Firm*—Dan R. Sadler

[57] ABSTRACT

A flexible and multi-directional stretchable sheet which is resistant to flame, moisture and degradation upon exposure to ultraviolet light and extreme temperature conditions, the sheet including a mixture of chlorinated polyethylene, polyvinylchloride, a heat stabilizer, a flame retardant, and a phosphate chelating agent.

8 Claims, No Drawings

THERMOPLASTIC FILM

BACKGROUND

The present invention relates to a composition, in film or sheet form, which has unique properties enabling it to be used for a number of purposes but, because of these unique properties, the composition is ideally suited for use as a liner and/or moisture barrier for flexible air conditioning ducts. The unique thermoplastic sheet or film of this invention can be utilized per se or can be reinforced with, for example, woven or non-woven fiberglass or other fabric or fiber.

Recently, flexible ducts have been utilized to distribute conditioned air throughout buildings and the like. Such ducts have an inner supporting structure or core (e.g., a flexible spring) with an insulating material made of fiberglass or the like surrounding the core and being supported thereby. A moisture resistant barrier made of a thermoplastic material such as polyvinylchloride or chlorinated polyethylene surrounds the insulting fiberglass mat or blanket. The moisture barrier must possess a certain amount of stretch so that it can be circumferentially expanded to fit over a sheet metal duct from the plenum chamber and/or the outlet fitting of a distribution box. However, materials heretofore utilized as the vapor barrier tend to rip and tear readily, do not have good resistance to outdoor aging (e.g., poor resistance to ultraviolet light or extreme temperature conditions), and do not have sufficient flexibility or resistance to flame. Accordingly, in an attempt to cure some of these deficiencies it has been proposed to laminate the moisture barrier to other films, foils, etc. However, even with such reinforcement, the prior art films or sheets heretofore utilized as moisture barriers for ducts to convey conditioned air have not been satisfactory.

It is thus desideratum in the art to provide a composition which can be in sheet or film form which fulfills all of the necessary criteria for a satisfactory moisture barrier for use in ducts conveying conditioned air. Generally speaking, such criteria include a composition which is resistant to flame and smoke, resistant to degradation by moisture, bacteria, ultraviolet light, and extreme differences in temperature (e.g. −20°F. to 200°F.Continuous), has excellent flexibility and stretchability at both extremely cold and extremely high temperatures so that the composition will not crack or otherwise become unsuited for its intended purpose at such temperatures, is impermeable to moisture, is easily processable as, for example, by calendering, extrusion casting, extrusion blowing and solvent casting, and is low in cost.

None of the prior art compositions possess these qualities.

SUMMARY

Accordingly, it is the primary object of the present invention to provide a composition which possesses all of the desirable characteristics which should be possessed by a film which is utilized as a moisture barrier for ducts carrying conditioned air.

Another object of the present invention is to disclose and embody a composition which is in sheet form, which is resistant to flame and smoke, is resistant to long term outdoor weathering, is flexible at both low and elevated temperatures, is impermeable to moisture, and is processable by normal manufacturing methods at a relatively low cost.

It is further object of the present invention to disclose and provide a composition in sheet or film form which can be sealed to itself by solvent, adhesive or heat.

It is still a further object of the present invention to embody and provide a novel mixture of ingredients, in certain critical concentrations, said ingredients including polyvinylchloride, chlorinated polyethylene, a certain type of flame retardant, a certain type of heat stabilizer, and a certain type of ultraviolet light stabilizer.

The accomplishment of the foregoing objects and others will be apparent to those skilled in the art from the following detailed description of the preferred exemplary embodiments of the present invention in which percentages and parts are by weight, based on the total amount of resin (i.e. polyvinylchloride and chlorinated polyethylene) present unless otherwise stated.

DESCRIPTION

The composition of the present invention comprises a number of ingredients in certain relatively critical proportions, said ingredients including a resin composition composed of polyvinylchloride and chlorinated polyethylene, an ultraviolet light stabilizer, a heat stabilizer and a flame retardant.

Generally speaking, the chlorinated polyethylene is present in an amount of from 45 to 80 percent, by weight, based on the entire amount of polyvinyl chloride and chlorinated polyethylene in the composition. The amount of chlorinated polyethylene in the composition is important if the composition is to have all of the desirable characteristics which should be possessed by a film or sheet for use as a liner and/or moisture barrier for flexible air conditioning ducts. If the film or sheet is to be formed by solvent casting it is generally preferred if the amount of chlorinated polyethylene present is from 55 or 60 percent to 80 percent, by weight. If, on the other hand, the film is to be formed by calendering or extrusion, the amount of chlorinated polyethylene present is preferably from about 45 or 50 percent, to as high as 75 percent, by weight.

The particular type of chlorinated polyethylene is not as critical as the amount of chlorinated polyethylene. For example, it is believed that polyethylene containing from 30 to 75 percent chlorine can be utilized in the present invention, the polymers containing a lesser amount of chlorine being softer and more rubbery than polymers containing greater amounts of chlorine. The preferred type of chlorinated polyethylene is one containing from about 35 or 40 percent, by weight, of chlorine, to as high as 50 or 60 percent, by weight, of chlorine.

As was the case with chlorinated polyethylene, the amount of polyvinylchloride in the composition of this invention is critical and, generally speaking, should be between about 20 and 55 percent, by weight, based on the total weight of the thermoplastic polymers, i.e., the combined weight of polyvinylchloride and chlorinated polyethylene. Again, as was the case with the chlorinated polyethylene, there are preferred amounts depending upon the method of forming the film or sheet. For example, if solvent casting is to be utilized, the amount of polyvinylchloride will vary from 20 percent to as high as 40 or 45 percent. If the film is to be made by calendering or extrusion, the amount of polyvinylchloride will be between 25 percent to as high as 50 or 55 percent.

As is known in the art, polyvinylchloride is amorphous and therefore the particular type of polyvinylchloride utilized in the present invention is not very critical. However, depending upon how the flexible sheet of this invention is made, it is sometimes preferred to have the polyvinylchloride having a certain molecular weight. Generally speaking, the molecular weight can vary between, for example, 9,000 and 25,000 but it is generally preferred if the composition is to be formed into a sheet or film by calendering or solvent casting that the molecular weight is generally around 10 to 15,000 (medium molecular weight). On the other hand, if the sheet is formed by extrusion, it is preferred that the polymer have a relatively low molecular weight which would be below 10,000, for example, between 5,000 and 10,000.

The composition of the present invention, in addition to the thermoplastic polymers ennumerated above, must also contain a heat and ultraviolet light stabilizing compound or compounds, and a flame retardant. The specific type of heat stabilizer, ultraviolet light stabilizer, and flame retardant are all critical as are the amounts, which are based on the combined weight of the thermoplastic polymers. It also should be noted that the compounds utilized as heat stabilizers may, in some instances, also be ultraviolet light stabilizers. But even if these dual functioning compounds are utilized, it is still necessary to have a specific ultraviolet light stabilizer.

As heat stabilizing compounds, I have found that one or more of the following type stabilizers may be utilized: epoxy stabilizers, organo tin stabilizers, and organo bariumcadmium stabilizers. The epoxy and organo tin stabilizers impart both heat and light stability, although in this invention they are primarily utilized for their heat stability.

Epoxy type stabilizers which are useful in the present invention are epoxidized triglycerides and epoxidized fatty acid esters of monohydric alcohols.

Generally, the epoxidized triglycerides are made by opoxidizing the double bonds produced from soy bean oil and the like by adding hydrogen peroxide to an acetic acid solution of the particular unsaturated compound which is desired to be epoxidized. This is true in the case of soy bean oil and also in the case of the epoxizied fatty acid esters such as alkyl esters derived from stearic acid and oleic acid. A particularly preferred epoxy compound is epoxidized peanut oil.

If the epoxy stabilizer is utilized it should be present in an amount of from 2 to 4 parts by weight, based on the combined weight of the thermoplastic polymers, and should also be utilized in conjunction with a barium-cadmium stabilizer, the amount of barium-cadmium stabilizer, being from 2 to 4 parts by weight, based on the entire weight of the thermoplastic polymers in the composition.

The barium-cadmium stabilizers of the present invention are the salts of barium and cadmium with aliphatic carboxylic acids having from 2 to 20 carbon atoms, the acids being either monocarboxylic or dicarboxylic. Exemplary of such acids are formic acid and maleic acid with the preferred acids being higher aliphatic, e.g., 10 to 20 carbon atoms and with the most preferred being the fatty acids such as lauric, stearic and ricinoleic acids. The preferred stabilizer is barium-cadmium laurate which is obtained by co-precipitating barium-cadmium laurate.

The other type of heat stabilizer in the present invention are the organo-tin compounds which can be utilized per se and should be present in the composition in an amount of from 2 to 4 parts, by weight, based on the total weight of the thermoplastic polymers present. Such organo-tin compounds include the di-(lower) alkyl di-fatty acid esters of tin such as dibutyl tin dilaurate and dibutyl tin maleate and also di(lower) aldyl tin mercaptides such as dibutyl tin mercaptide, which are the preferred organo-tin compounds of the present invention.

Flame retardants which can be utilized in the present invention include aluminum oxides and antimony oxides, examples of such compounds being aluminum hydrate and antimony trioxide. The flame retardant should be present in an amount of from 10 to 25 or 35 parts by weight.

The compositions of the present invention should also contain a phosphate chelating agent as an ultraviolet light stabilizer if the desirable properties of the compositions of this invention are to be obtained. Generally speaking, such phosphate chelating agents can be alkyl or aryl organic phosphates such as triphenyl phosphate and trioctyl phosphate. The phosphate chelating agent will be utilized in relatively small but critical amounts, say from 0.25 to as high as 1.0 or 2.0 parts, by weight, based on the combined weight of the thermoplastic polymers.

In addition to the foregoing, the compositions of the present invention may contain lubricants such as calcium stearate in amounts of from 1 to 5 or 10 parts by weight, based on the thermoplastic polymers, and pigments such as carbon black. If carbon black is utilized it will also act as an ultraviolet light absorber, however, because of the other stabilizers present in the compositions of the present invention, carbon black is not necessary.

The above components (except for the lubricant and pigment) are all critical, as are the amounts. The compositions of this invention are delicately balanced in order to obtain the desired properties.

In order to form a composition in accordance with this invention utilizing solvent casting, the following ingredients are utilized in the amounts indicated:

| Ingredients | Amount (Parts by Weight) |
| --- | --- |
| Chlorinated polyethylene* | 80 |
| Polyvinylchloride (510)** | 20 |
| Aluminum Hydrate | 20 |
| Calcium stearate | 1.5 |
| Dibutyl tin mercaptide | 2.5 |
| Triphenyl phosphate | 0.25 |
| Antimony trioxide | 4.0 |
| Carbon black | 2.0 |

*Chlorinated polyethylene having 48% by weight of chlorine, no crystallinity and a viscosity of 18,000 poises.
**Polyvinylchloride having 57% weight of chlorine and a specific viscosity of .38.

The chlorinated polyethylene, polyvinylchloride, and aluminum hydrate were added to a dry blend mixer at a temperature of 80°F, the mixer having a speed of 2,000 RPM, and the ingredients mixed for two minutes. Thereafter, the temperature was raised to 90°F and triphenyl phosphate was added and these ingredients mixed for 1 minute. The remaining ingredients were then added and the temperature maintained at 90°F. These ingredients were mixed for 2 minutes and then removed from the mixer.

The mixture obtained as indicated above was added to toluol and/or tetrahydrofuran mixture of varied concentrations to have a solution with 20 to 50 percent solids. The solution was applied to a release sheet and the solvent flashed off. There was thus formed a continuous film containing the original compounds.

In order to prepare a film by means of calendering, the following ingredients were utilized:

| Ingredients | Amount (Parts by Weight) |
| --- | --- |
| Chlorinated polyethylene* | 60 |
| Polyvinylchloride (510) | 40 |
| Aluminum Hydrate | 20 |
| Calcium Sterate | 1.0 |
| Barium-cadmium laurate | 2.0 |
| Epoxidized peanut oil | 3.0 |
| Triphenyl phosphate | 1.0 |
| Antimony trioxide | 4.0 |
| Carbon black | 2.0 |

*The chlorinated polyethylene has 42% by weight of chlorine, 8% crystallinity, and a viscosity of 22,000 poises.

In order to form a film with the above ingredients, the chlorinated polyethylene, polyvinylchloride, and barium-cadmium laurate were added to a dry blend mixer at a temperature of 80°F, the mixer having a speed of 2,000 RPM. These ingredients were mixed for 2 minutes and the temperature was raised to 90°F and the triphenyl phosphate and the epoxidized peanut oil were added and these ingredients were then mixed for one minute. Thereafter, the remaining ingredients were added and mixed for another 2 minutes at 90°F. The ingredients were then removed from the mixer and the composition passed through a series of heated rolls with minimal roll clearance. The composition was physically pressed into a film via the heat and pressure from the heated rolls. The thus obtained film was 2.5 mil and was laminated to both sides of a non-woven fiberglass scrim. The general appearance of the composition was smooth and free of wrinkles and had a tensil strength of 20 pounds per inch (warp) and 15 pounds per inch (fill). The flame resistance was excellent as indicated by a flame out in 2 seconds, afterglow in two seconds, and a char length of 2 inches.

In addition to the above properties when laminated to the fiberglass scrim, it also had the following properties:

| | |
| --- | --- |
| Specific Gravity | 1.44 |
| Tensile (psi) | 1750 |
| Elongation (%) | 200 |
| Durometer (Shore A) | 85 |
| Flexural Modulus (psi) | 5200 |
| Flammability | |
| Oxygen Index | 36 |
| Flame Propagation | 5 |
| Smoke evolution | 10 |
| Permeability (perms) | 0.5 |
| Clash & Berg (°C) | −8 |
| Yield Temperature (°F) | 435° at 7 min. |
| Extrusion Rheology | |
| Torque (M-g) | 4400 |
| Back pressure (PSIG) | 3500 |
| Stock temp (°F) | 400° |

In order to prepare a film in accordance with the present invention by extrusion, the following ingredients were utilized:

| Ingredients | Amount (Parts by Weight) |
| --- | --- |
| Chlorinated polyethylene* | 60 |
| Polyvinylchloride (530)** | 40 |
| Aluminum hydrate | 20 |
| Calcium sterate | 1.0 |
| Barium-cadmium laurate | 2.0 |
| Epoxidized peanut oil | 3.0 |
| Triphenyl phosphate | 1.0 |
| Antimony trioxide | 4.0 |
| Carbon black | 2.0 |

*The chlorinated polyethylene has 42% by weight of chlorine, no crystallinity, and a viscosity of 18,000 poises.
**The polyvinylchloride (530) has 57% by weight of chlorine and a specific viscosity of .25.

The above ingredients are formed into a film by adding to a dry blend mixer at a speed of 2,000 RPM and a temperature of 80°F the chlorinated polyethylene, the polyvinylchloride, and the barium-cadmium laurate. These ingredients were mixed for 2 minutes and then the temperature was raised to 90°F and the triphenyl phosphate and epoxidized peanut oil are added and 80°F the chlorinated polyethylene, the polyvinylchloride, and the barium-cadmium laurate. These ingredients were mixed for 2 minutes and then the temperature was raised to 90°F and the triphenyl phosphate and epoxidized peanut oil are added and mixed for another minute. Thereafter, the remaining ingredients were added and mixed for 2 minutes and then removed from the mixer.

The thus obtained composition was then extruded into a melt condition and the melt is formed into a blown tubular film by the blown film process or, in the alternative, the melt is extruded through a film die. The thus formed film has the desirable properties enumerated above.

It should also be noted that although certain temperatures and RPM were exemplified in the preferred exemplary embodiment, these temperatures and mixing techniques can be varied and the invention is not to be construed to be limited to certain specific mixing techniques. Moreover, in the preferred exemplary embodiments, certain specific compounds and amounts were exemplified, such exemplification being solely for the purpose of illustrating the invention and is not to be considered limited thereto since modifications thereof are clearly taught in the specification.

I claim:

1. A flexible and multi-directional stretchable sheet which is resistant to flame, moisture and degradation upon exposure to ultraviolet light and temperatures between −20°F and 140°F, said sheet consisting essentially of (A) a thermoplastic resin component consisting essentially of from 45 to 80 percent, by weight, of chlorinated polyethylene and from 20 to 55 percent, by weight, of polyvinylchloride; (B) from 2 to 4 parts, by weight, based on the resin component, of a heat stabilizer selected from the group consisting of an epoxy stabilizer, a barium-cadmium stabilizer, and an organa-tin stabilizer; (C) from 10 to 35 parts, by weight, based on the weight of the resin component, of a flame retardant selected from the group consisting of aluminum oxide and antimony oxide; and (D) from 0.25 to 2.0 parts, by weight, based on the weight of the resin component, of a phosphate chelating agent.

2. A sheet, according to claim 1, wherein the chlorinated polyethylene contains from 30 to 75 percent, by weight, of chlorine.

3. A sheet, according to claim 1, wherein the polyvinylchloride has a molecular weight of between 5,000 and 25,000.

4. A sheet, according to claim 3, wherein the polyvinylchloride has a molecular weight of between 5,000 and 15,000.

5. A sheet, according to claim 1, wherein the epoxy stabilizer is epoxidized peanut oil.

6. A sheet, according to claim 1, wherein the phosphate chelating agent is selected from the group consisting of alkyl phosphate and aryl phosphate.

7. A sheet, according to claim 1, which contains carbon black, as an ultraviolet light absorber, and a lubricant.

8. A sheet, according to claim 7, wherein the lubricant is calcium sterate which is present in the amount of from 1 to 10 parts, by weight, based on the amount of thermoplastic resin component.

* * * * *